United States Patent
Ochiai et al.

[11] 3,929,775
[45] Dec. 30, 1975

[54] PROCESS FOR PRODUCING CEPHALOSPORIN DERIVATIVES

[75] Inventors: Michihiko Ochiai, Osaka; Osami Ari, Hyogo; Akira Morimoto, Osaka; Taiiti Okada, Kyoto; Katsutada Masuda, Hyogo, all of Japan

[73] Assignee: Takeda Chemical Industries, Ltd., Osaka, Japan

[22] Filed: Dec. 3, 1971

[21] Appl. No.: 204,771

[30] Foreign Application Priority Data
Dec. 8, 1970 Japan............................. 45-109159
Mar. 23, 1971 Japan............................. 46-16726
May 20, 1971 Japan............................. 46-34207

[52] U.S. Cl.............................. 260/243 C; 424/246
[51] Int. Cl.²....................................... C07D 501/02
[58] Field of Search .............................. 260/243 C

[56] References Cited
UNITED STATES PATENTS
3,647,786  3/1972  Cooper ........................... 260/243 C
3,853,860  12/1974  Weir ................................ 260/243 C

*Primary Examiner*—Nicholas S. Rizzo
*Attorney, Agent, or Firm*—Wenderoth, Lind & Ponack

[57] ABSTRACT

The present invention relates to a process for producing cephalosporin derivatives of the general formula:

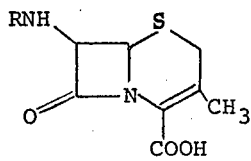

and/or

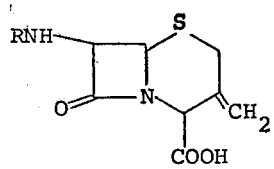

wherein R is hydrogen or an acyl group, which comprises treating a compound of the general formula:

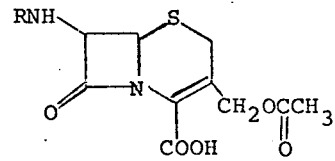

wherein R is as defined above, with a divalent chromium compound such as chromous acetate or chromous sulfate. According to the method of the present invention cephalosporin derivatives can be obtained in a high purity and high yield without the use of expensive large amounts of metal catalysts. Cephalosporin derivatives are known to have good adsorption and/or distribution in the living body and some of the compounds derived according to the present invention have excellent value in the treatment of various bacterial infections.

13 Claims, No Drawings

PROCESS FOR PRODUCING CEPHALOSPORIN DERIVATIVES

The present invention relates to a novel process for producing cephalosporin derivatives and more particularly to a process for producing cephalosporin derivatives having a methyl group at the 3-position of the general formula:

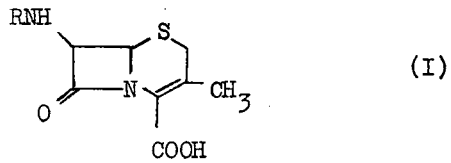

wherein R is hydrogen or an acyl group.

Some cephalosporin derivatives are known to have excellent antibacterial activities and show good absorption and/or distribution in the living body and such cephalosporin derivatives as cephalothin, cephaloridine and cephalexin have been actually put to use. Especially, 3-methyl compounds such as cephalexin have proven to be of excellent value in the treatment of various bacterial infections when orally administered. Among the hithertoknown methods for the synthesis of cephalosporin derivatives having a methyl group at the 3-position, may be mentioned the catalytic reduction of 7-amino or 7-acylamino-3-acetoxymethyl-3-cephem-4-carboxylic acid derivatives and the conversion of penicillin derivatives to cephem-ring compounds which comprises the rearrangement reaction of the penam ring. However, both methods are not fully satisfactory from a commercial point of view. Thus, the former method involves the use of an expensive metal catalyst in such large amounts as are not conceivable in the usual catalytic reduction reactions and, also, frequently requires a complicated extraction procedure, which reduce the yield extremely because the end product tends to be strongly adsorbed on the catalyst.

The latter method fails to assure a high overall yield because it involves at least four reaction steps, namely the esterification of the 3-carboxyl group of the starting material penicillin derivative, the sulfoxidation of the ester, the rearrangement reaction and the hydrolysis of the 4-carboxylic acid ester group of the resulting cephalosporin compound.

It has been found that, by the treatment with a divalent chromium compound, a 3-acetoxymethyl compound represented by the general formula:

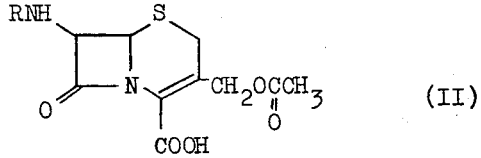

wherein R is as defined before, can be readily converted to cephalosporin derivatives (I) and/or a novel 3-methylene compound of the general formula:

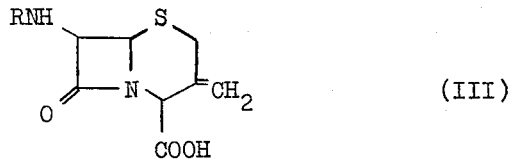

wherein R is as defined above, and the 3-methylene compound (III) can be easily isomerized to cephalosporin derivatives (I). These methods are entirely free from the disadvantages inherent in the conventional methods mentioned above and enable the desired compounds to be produced without difficulty in a high purity and in a good yield.

The principal object of the present invention is to provide a novel and industrial process for producing cephalosporin derivatives (I).

Another object of the present invention is to provide 3-methylene compounds (III), which are convertible to cephalosporin derivatives (I) and methods for producing them (III).

Other objects of the present invention and advantages thereof will become apparent as the description proceeds.

According to the present invention, cephalosporin derivatives (I) can be produced by treating 3-acetoxymethyl compounds (II) with a divalent chromium compound and, when 3-methylene compounds (III) are produced, by isomerizing 3-methylene compounds (III).

In the starting compound, i.e. 3-acetoxymethyl compounds (II), the acyl group involves the group derived from carboxylic acid or substituted carboxylic acid and may includes any one which has been used as the N-acyl group of the known cephalosporin or penicillin compounds. Among them, there are 5-amino-5-carboxyvaleryl and its N-acyl compound, thienylacetyl, phenylglycyl, α-sulfophenyl-acetyl, pyridylthioacetyl, phenoxyacetyl, 5-methyl-3-phenyl-4-isoxazolylcarbonyl, 1-cyclohexenylglycyl, cyanoacetyl, tetrazolylacetyl, β-ethylsulfonylethoxycarbonyl, β-phenylsulfonylethoxycarbonyl, acylaminomethylphenyl-acetyl and the like.

When an amino-substituted acyl group is employed, it is desirable to previously mask the amino group with a protecting group of an amino group such as β-methylsulfonylethoxycarbonyl, isobornyloxycarbonyl, proton and so on.

The 3-acetoxymethyl compounds (II) are preferably used in the form of free acid or salt, for example, an inorganic salt (e.g. sodium salts, potassium salts, etc.), ammonium salt or an organic amine salt (e.g. triethylamine salt, cyclohexylamine etc.), intramolecular salt, i.e. betaine.

The divalent chromium compound to be employed in this invention is exemplified by chromous acetate, chromous sulfate, chromous chloride, chromous ethylenediamine and the like. The anions of those chromium compounds may be freely selected according to other conditions of this invention, e.g. the type of solvent and of 7-acyl group. Theoretically, an equivalent of the divalent chromium compound is employed relative to 3-acetoxymethyl compound (II). However, there are instances wherein the reaction proceeds smoothly when a slight excess of chromium compound is employed.

In the course of the present reaction, the divalent chromium compound is oxidized to the trivalent chromium compound. However, the latter compound can be reconverted to the divalent chromium compound for reuse by applying a reduction potential in a cathodic reduction circuit. The process of this invention may also be carried out advantageously in the presence of a metal or metallic ion having an ionization potential which reduces chromic ions (III) to chromous ions (II) in the reaction system. Among typical examples of such metal or metallic ions, there may be mentioned iron, copper, zinc, lead, arsen, tin, manganese, nickel, cuprous ion, and so forth.

As the solvent to be used in the present reaction, any suitable solvent which does not hamper the reaction can be employed; exemplary solvents includes water, such organic solvents as alcohols (e.g. methanol, ethanol, etc.), ethers (e.g. tetrahydrofuran, dioxane, etc.) or acetone, acetonitrile, dimethylformamide, dimethylsulfoxide, etc. and various mixtures of such solvents. The reaction can be advantageously carried out particularly when water is concomitantly present. While the reaction temperature and time depend upon such factors as the types of 3-acetoxymethyl compound (II), a divalent chromium compound and solvent and the like, the reaction is generally conducted at a temperature of the range from 0° to 100°C for a period varying from a few minutes to several days. The reaction can be advantageously carried out in an atmosphere of carbon dioxide or nitrogen or at a pH of 2 to 8, preferably at a pH of 4 to 8.

By selecting a suitable combination of reaction conditions within the scope hereinbefore indicated, a cephalosporin derivative and a 3-methylene compound (III), as well as their salts, can be produced either selectively or as a mixture. 3-Methylene compounds (III), which are among the thus obtained compounds can be isomerized to cephalosporin derivatives (I). In this reaction, the starting compounds (III) to be used may be in the ester form, which ester residue may be exemplified by organic groups such as methyl, ethyl, benzyl, benzhydryl, methoxybenzyl, isobornyl, methylthiomethyl, $\beta$-methylsulfonylethyl, phenyl, nitrophenyl, $\beta$-trichloroethyl, etc., or inorganic groups such as trimethylsilyl, dimethylsilenyl and the like. Incidentally, when a polyfunctional esterifying agent such as dimethyldichlorosilane is employed, the ester residue may contain one or more cepham nuclei. The isomerization reaction can be conveniently carried out in a solvent and in the presence of a catalyst. Among the useful solvents, to be employed according to the present invention may be mentioned such organic solvents as methanol, ethanol, acetone, tetrahydrofuran, dioxane, chloroform, ethyl acetate, ether, benzene, dichloromethane, etc.; such basic solvents as aromatic or tertiary amines (e.g. pyridine, picoline, lutidine, quinoline, isoquinoline, dimethylaniline, triethylamine, N-methylpiperidine), etc. or a mixture thereof. As the said catalyst, there may be employed any of the above-mentioned basic solvents, as well as any of such adsorbents as silica gel, alumina, and so on. The temperature and time of this isomerization reaction depend upon such factors as the types of starting compounds (I), solvent, and any additive used to promote the isomerization. Generally, those variables are selected within the range of 0° to 100°C and the range of a few minutes to several days.

Among the 3-methylene compounds (III), those in which R is an acyl group, may be converted to the cephalosporin derivatives (I) by deacylating at the 7-position and subjecting the 7-amino compounds thus obtained to the isomerization reaction and then to the acylation reaction to be explained below. The order of the latter two reactions can be altered if desired. Those procedures are preferably adopted to such compounds as are derived from cephalosporin C.

The deacylation reaction can be effected in a similar manner employed in the production of 7-aminocephalosporanic acid from cephalosporins. For example, when the acyl groups at the 7-position of 3-methylene compounds (III) have a free amino group, 7-amino compounds can be obtained by treating 3-methylene compounds (III) with a nitrosation agent, followed by hydrolysis. The nitrosation agent includes, for example, nitrosyl chloride, nitrosyl bromide, nitrous acid, aliphatic alcohol esters of nitrous acid, nitrogen dioxide, nitrosylsulfuric acid and the like. This reaction is usually carried out in a solvent. Such aliphatic acids as formic acid, acetic acid and the like are commonly used as the solvent. Alternatively, mixtures of these acids and conventional organic solvents such as benzene, toluene, nitromethane, dichloromethane, chloroform, tetrahydrofuran and the like may be used. It is preferable to conduct the reaction under cooling in order to suppress the undesirable side reactions. The reaction product can be hydrolyzed without isolation.

If the acyl groups at the 7-position of the 3-methylene compounds (III) have no free amino group, 7-amino compounds can be produced by treating 3-methylene compounds (III) with an imido halide forming agent and the thus-obtained imido halide is converted into the imino ether, followed by hydrolysis. These reactions may be also applicable to the cephalosporin compounds having protected amino groups, the protecting group of which does not interfere with this reaction; for example, benzyloxycarbonyl, methoxycarbonyl, t-butoxycarbonyl, i-butoxycarbonyl, $\beta$-methylsulphonylethoxycarbonyl, isobornyloxycarbonyl and the like. The imido halide forming agent may be a halide derived from carbon, phosphor or sulfur, or an oxyhalide derived from their oxy acids. They include, for example, phosphorus oxychloride, phosphorus pentachloride, phosphorus trichloride, thionyl chloride, phosgene, oxalyl chloride and the like. The imido halide forming reaction is advantageously conducted in a solvent. The preferable solvent is a tertiary amine such as triethylamine, pyridine, dimethylaniline or the like. After the imido halide formation, an alcohol is added to the reaction mixture to obtain the corresponding imino ether. The alcohol employed in the imino ether formation may be a lower alcohol such as methanol, ethanol or the like. It is preferred to conduct the above-mentioned reactions under cooling in order to suppress the undesirable side reactions. The thus obtained imino ether is hydrolyzed with water to give 7-amino compounds. This hydrolysis may be carried out smoothly by adding a small quantity of acid such as formic acid, acetic acid, etc. On the completion of the hydrolysis, the pH of the reaction mixture is adjusted to be within the range from 3.5 to 4.0 to yield in high purity the desired 7-amino compounds.

In these deacylating reactions, the carboxyl group of the starting 3-methylene compounds (III) may be protected as in the form of an ester such as benzyl, $\beta$-methylsulphenylethyl, benzhydryl, trimethylsilyl ester or the like.

The thus-obtained 7-amino compounds may be acylated with a suitable carboxylic acid or its functional derivatives to prepare the desirable cephalosporin compounds having excellent antibiotic activity. The desirable carboxylic acids employed for the acylation include phenylglycine or its substituted derivatives at the amino group, phenylacetic acid, p-nitrophenylacetic acid, 1-cyclohexenylglycine or its substituted derivatives at the amino group, trimethylcyclohexynylglycine, thienylacetic acid, α-sulfophenylacetic acid, tetrazolylacetic acid, and the like. The substituent of the above-mentioned amino group includes methoxycarbonyl, benzyloxycarbonyl, t-butoxycarbonyl, isobornyloxycarbonyl, benzoyl, nitrobenzoyl and the like.

In the acylation reaction, when a free carboxylic acid is employed as the acylating agent, it is advantageous to use a suitable condensing agent. The condensing agent includes, for example, N,N′-disubstituted carbodiimides such as N,N′-dicyclohexylcarbodiimide and the like; azolide compounds such as N,N′-carbonylimidazole, N,N′-thionyldiimidazole and the like; and such dehydrating agents as N-ethoxycarbonyl-2-ethoxy-1,2-dihydroquinoline, phosphorus oxychloride, alkoxyacetylene and the like. The functional derivatives of the carboxylic acids include acid halides, acid anhydrides mixed acid anhydrides, active amides, esters and the like. Particularly usable examples are acid chloride, alkylcarbonic acid anhydrides, mixed anhydrides with an aliphatic carboxylic acid, acid azolides and the like. This reaction, in general, can advantageously and smoothly be conducted in a solvent. The solvent may be any solvent or solvent mixture so long as it does not interfere with the reaction of the present invention. It includes water, acetone, tetrahydrofuran, dioxane, acetonitrile, chloroform, dichloromethane, dichloroethylene, pyridine, dimethylaniline, dimethylformamide, dimethylacetamide, dimethyl sulfoxide and the like. The reaction temperature is not critical. However, the reaction is usually carried out under cooling or at room temperature.

The reaction product obtained in the above manner may be purified by such known techniques as column chromatography, extraction, isoelectric precipitation, countercurrent distribution and recrystallization.

According to the present invention, cephalosporin derivatives can be obtained in a high purity and in a good yield without the use of an expensive metal catalyst in large amounts. The 3-methylene compounds (III) obtainable according to this invention are also useful as intermediates for the synthesis of new cephalosporin derivatives.

It is to be understood that the following examples are solely for the purpose of illustration and not to be construed as a limitation of this invention.

In this specification, "part" means "weight part" unless otherwise specified, and the relationship between "part(s)" and "part(s) by volume" corresponds to that gram(s) and milliliter(s).

EXAMPLE 1

To 7000 parts by volume of water are added 418 parts of sodium 7-(2-thienylacetamido) cephalosporanate and 400 parts of chromous acetate and the mixture is stirred under nitrogen atmosphere at room temperature for 24 hours. During this time, the reaction mixture shows a pH of about 5. The reaction mixture is adjusted to a pH of 6.8 with an aqueous solution of sodium hydrogen carbonate and, then, treated with a column of polystyrene resin, whereby sodium 7-(2-thienylacetamido)-3-methyl-3-cephem-4-carboxylate and sodium 7-(2-thienylacetamido)-3-methylenecepham-4-carboxylate are obtained.

The former compound melts at a temperature from 231° to 232°C and shows in the infrared spectrum (KBr disc), an absorption due to a β-lactam at 5.75 μ and in the ultraviolet spectrum (water) shows an absorption maximum due to the $\Delta^3$-cepham ring at 260 mμ.

The nuclear magnetic resonance spectrum (heavy water, 100 Mc) of the same compound shows a singlet due to the 3-methyl group at 2.14 ppm, an AB quartet due to the 2-methylene protons at 3.59 ppm, doublets ($J_{6-7}$=4 cps) due to the protons in 6 and 7 positions at 5.26 ppm and 5.76 ppm, respectively, and a multiplet due to the thiophene ring protons at 7.20 to 7.70 ppm.

The latter compound shows in the infrared spectrum (KBr disc) an absorption due to a β-lactam at 5.75 μ and an absorption due to the exomethylene at 11 μ, and in the ultraviolet spectrum (water), no absorption indicative of a $\Delta^3$-cephem ring in the neighborhood of 260 mμ. The nuclear magnetic resonance spectrum (heavy water, 100 Mc) of this compound shows an AB quartet (J=12 cps) due to the 2-methylene protons at 3.64, a singlet due to 2-methylene protons of the thiophene at 4.07 ppm, a doublet (J=3 cps) due to the 3-exomethylene group at 5.42 ppm, doublets ($J_{6-7}$=4 cps) due to the 6,7 protons at 5.54 ppm and 5.60 ppm, respectively, and a multiplet due to the thiophene ring protons at 7.15–7.60.

EXAMPLE 2

To a mixture of 700 parts by volume of water and 500 parts by volume of acetone are added 50 parts of sodium 7-(2-thienylacetamido) cephalosporanate and 300 parts of chromous acetate, and the mixture is stirred under a carbon dioxide atmosphere at a temperature of from 50° to 60°C for 30 hours. The reaction mixture is adjusted to a pH of 2 with 1N-hydrochloric acid and extracted with ethyl acetate. The ethyl acetate layer is separated and esterified with diazomethane in the conventional manner and the resulting ester is purified by chromatography on silica gel, whereby, methyl-7-(2-thienylacetamido)-3-methyl-3-cephem-4-carboxylate and methyl 7-(2-thienylacetamido)-3-methylenecepham-4-carboxylate are obtained.

The former compound shows in the ultraviolet spectrum (ethanol) an absorption maximum due to the $\Delta^3$-cephem ring at 260 mμ and has a molecular weight of 352 (theoretical 352) as determined by mass analysis.

The nuclear magnetic resonance spectrum (deuteriochloroform, 100 Mc) of the same compound shows a singlet due to the 3-methyl group at 2.10 ppm, an AB quartet due to the 2-methylene protons at 3.28 ppm, a singlet due to the ester methyl group at 3.69 ppm, a singlet due to the 2-methylene protons of the thiophene ring at 4.01 ppm, a doublet ($J_{6-7}$=4 cps) due to the hydrogen in the 6-position at 5.10 ppm, a doublet of doublet ($J_{6-7}$=4 cps, $J_{7-NH}$=10 cps) due to the hydrogens in the 7-position at 5.70 ppm, a doublet ($J_{7-NH}$=10 cps) due to the 7-NH at 6.52 and a multiplet due to the thiophene ring protons at 6.90–7.30 ppm.

The latter compound has a melting point of 77.5°–78.5°C and gives the following elementary analysis, Calcd. for $C_{15}H_{16}O_4N_2S_2$: C, 51.12; H, 4.57; N, 7.94. Found: C, 51.38; H, 4.34; N, 7.92.

The molecular weight of this compound as determined by mass analysis is 352 (theoretical 352).

The compound shows in the infrared spectrum (chloroform) an absorption due to the β-lactam at 5.67 μ and an absorption due to the exomethylene group at 11 μ. The ultraviolet absorption spectrum (ethanol) of the compound shows an absorption maximum at 233 mμ (ϵ=9092) but no absorption indicative of a Δ³-cephem ring at 260 mμ.

The nuclear magnetic resonance spectrum (deuteriochloroform 100 Mc) of the same compound shows a pair of doublets (J=13 cps) due to the 2-methylene protons at 3.12 and 3.62 ppm, a singlet due to the ester methyl group at 3.72 ppm, a singlet due to the 2-methylene protons of the thiophene ring at 3.78 ppm, a singlet due to the protons at 5.01 ppm, a broad singlet due to the 3-exomethylene protons at 5.17 ppm, a doublet ($J_{6-7}$=4 cps) due to the proton in 6-position at 5.32 ppm, a doublet of doublet ($J_{6-7}$=4 cps, $J_{7-NH}$=10 cps) due to the protons in 7-position at 5.60 ppm, a doublet ($J_{7-NH}$=10 cps) due to the 7-NH at 6.45 ppm and a multiplet due to the thiophene ring protons at 6.80–7.20 ppm.

EXAMPLE 3

When the reaction of Example 2 is conducted for 48 hours, methyl 7-(thienylacetamido)-3-methyl-3-cephem-4-carboxylate alone is selectively obtained.

EXAMPLE 4

To a mixture of 8000 parts by volume of water and 200 parts by volume of acetic acid are added 400 parts of 7-(D-2-amino-2-phenylacetamido)-cephalosporanic acid, 400 parts of chromous acetate and 200 parts of zinc dust, and the mixture is stirred under a nitrogen atmosphere at room temperature for 48 hours. The reaction mixture is adjusted to a pH of 4.5 with an aqueous solution of sodium hydrogen carbonate and, then, cooled, whereby 7-(D-2-amino-2-amino-2-phenylacetamido)-3-methyl-3-cephem-4-carboxylic acid is obtained.

This compound shows in the ultraviolet spectrum (water) an absorption due to the Δ³-cephem ring at 260 mμ (ϵ=7700), and the nuclear magnetic resonance spectrum (heavy water, 100 Mc) of the corresponding sodium salt shows a singlet due to the 3-methyl group at 2.06 ppm, an AB quartet due to the 2-methylene protons at 3.45 ppm, two doublets due to the protons in 6,7-positions at 5.14 and 5.66 ppm, respectively, and a singlet due to the phenyl ring protons at 7.62 ppm.

EXAMPLE 5

To a mixture of 6000 parts by volume of water, 200 parts by volume of acetic acid and 2000 parts by volume of dimethylformamide are added 400 parts of 7-aminocephalosporanic acid, 400 parts of chromous chloride and 100 parts of iron dust.

The mixture is stirred at 40°C for 30 hours. After filtration the reaction mixture is adjusted to a pH of 4.5 with an aqueous solution of sodium hydrogen carbonate and, then, cooled, whereby 7-amino-3-methyl-3-cephem-4-carboxylic acid is obtained. This compound shows in the infrared spectrum (Nujol), an absorption due to a β-lactam at 5.58 μ and in the ultraviolet spectrum (water), an absorption due to a Δ³-cephem ring at 263 mμ (ϵ=7500).

EXAMPLE 6

To 8000 parts by volume of water are added 400 parts of potassium 7-phenylacetamidocephalosporanate, 400 parts of chromous sulfate and 100 parts of copper dust. The mixture is stirred at 70°C for 20 hours. After filtration, the reaction mixture is adjusted to a pH of 6.8 with an aqueous solution of potassium carbonate and treated with a polystyrene resin column, whereby potassium 7-phenylacetamido-3-methyl-3-cephem-4-carboxylate is obtained. This product has a melting point of 212°–213°C and shows in the infrared spectrum (KBr disc), an absorption maximum due to a β-lactam at 5.75 μ. The nuclear magnetic resonance spectrum (heavy water, 60 Mc) of this compound shows a singlet due to the 3-methyl group at 1.89 ppm and two doublets ($J_{6-7}$=4 cps) due to the protons in 6,7-positions at 5.02 ppm and 5.53 ppm, respectively.

EXAMPLE 7

To 7000 parts by volume of water are added 420 parts of sodium 7-(2-thienylacetoamido)cephalosporante and 270 parts of chromous chloride. The mixture is stirred under a nitrogen atmosphere at room temperature for 30 hours.

The reaction product is treated in the same manner as Example 2, whereby 28 parts of methyl 7-(2-thienylacetoamido)-3-methylenecepham-4-carboxylate is obtained.

EXAMPLE 8

To 14000 parts by volume of dimethylsulfoxide in 7000 parts by volume of water are added 412 parts of sodium 7-phenylacetoamidocephalosporanate and 600 parts of chromous acetate.

The mixture is stirred under a nitrogen atmsophere at room temperature for 24 hours. The reaction mixture is poured into a large amount of water, followed by adjusting to a pH of 2 with dilute hydrochloric acid and extracting with ethyl acetate. The ethyl acetate layer is separated and dried over magnesium sulfate. To the dried ethyl acetate layer is added 2N-solution of sodium 2-ethylhexanate in isopropanol to yield 87 parts of sodium 7-phenylacetoamido-3-exomethylenecepham-4-carboxylate melting at 220° to 222°C (decomp.).

This compound shows in the infrared spectrum (KBr disc), an absorption due to a β-lactam at 1740cm⁻¹ and an absorption due to the exomethylene at 920 cm⁻¹.

The nuclear magnetic resonance spectrum (heavy water, 100 Mc) of the same compound shows a quartet due to the 2-methylene protons at 3.64 ppm, a singlet due to the hydrogen in the 4-position at 5.12 ppm, two singlets due to the 3-exomethylene proton at 5.39, 5.41 ppm, an AB quartet due to the 6,7 protons at 5.46 ppm.

EXAMPLE 9

A sodium 7-acylamidocephalosporanate having an acyl group listed in the following table is treated in the similar manner as Example 8 to give the corresponding sodium 7-acylamido-3-exomethylenecepham-4-carboxylate.

| An acyl group of the product | Physicochemical properties of the product |
|---|---|
| Phenoxyacetyl | M.p.: 208 to 212°C (decomp.) Infrared spectrum (KBr disc) 1750 cm⁻¹ (β-lactam) 920 cm⁻¹ (exomethylene protons) Nuclear magnetic resonance spectrum (heavy water, 100 Mc) 3.62 ppm (quartet due to 2-methylene protons) 5.32 ppm (singlet due to hydrogen in the 4-position) 5.80, 5.82 ppm (doublet due to 3-exomethylene protons) 5.60 ppm (AB quartet due to hydrogens in 6,7-positions) |
| D-2-amino-2- | Nuclear magnetic resonance spectrum |

-continued

| An acyl group of the product | Physicochemical properties of the product |
|---|---|
| phenylacetyl | (heavy water, 100 Mc)<br>3.50 ppm (quartet due to 2-methylene protons)<br>5.07 ppm (singlet due to hydrogen in 4-position)<br>5.33 ppm (singlet due to 3-exomethylene-protons)<br>5.49, 5.65 ppm (doublet due to hydrogens in 6,7-position ($J_6$ $_7$=4 cps))<br>Elementary analysis<br>Calculated for $C_{16}H_{16}N_3O_3SNa$:<br>C, 52.03; H, 4.36<br>Found: C, 51.93; H, 4.75 |
| 5-amino-5-carboxyvaleryl | Nuclear magnetic resonance spectrum (heavy water, 100 Mc)<br>3.74 ppm (quartet due to 2-methylene protons)<br>5.21 ppm (singlet due to hydrogen in 4-position)<br>5.63 ppm (singlet due to 3-exo-methylene protons) |

EXAMPLE 10

1.5 parts of the disodium salt of 7-(5-carboxy-5-aminovalerylamino)-3-exomethylenecepham-4-carboxylic acid is dissolved in 4 parts by volume of 99% formic acid under ice-cooling.

To this cooled solution is added a solution of 0.3 parts in one part by volume of formic acid. After 5 minutes, the reaction mixture is concentrated under reduced pressure. To the residue is added 3.5 parts by volume of water, followed by adjusting the pH to about 3.5 with an aqueous solution of sodium hydroxide under ice-cooling. The resulting precipitates are collected by filtration to obtain 7-amino-3-exomethylenecepham-4-carboxylic acid.

Elementary analysis: Calculated for $C_8H_{10}N_2O_3S.1/4-H_2O$: C, 43.92; H, 4.83; N, 12.82; S, 14.65. Found: C, 43.76; H, 4.73; N, 12.40; S, 14.43.

In NMR spectrum (deuterio trifluoroacetic acid, 100 Mc), this product shows an AB-quartet due to the 2-methylene protons at 3.61 ppm, two doublets due to the $C_6$ and $C_7$-hydrogens at 5.18 and 5.68 ppm, respectively ($J_{6-7}$=4 cps), a singlet due to the hydrogen in the 4-position at 5.36 ppm and a slightly broad singlet assignable to the 3-exomethylene protons at 5.48 ppm.

EXAMPLE 11

3 parts of 7-(2-thienylacetamido)-3-exomethylenecepham-4-carboxylic acid is added to 100 parts by volume of dichloromethane. To the mixture are added 5 parts by volume of pyridine and 10 parts by volume of trimethylchlorosilane and stirred for 10 min. at room temperature. The reaction mixture is cooled to −10°C, and 10 parts of pyridine and 7 parts of phosphorus pentachloride are added to the cooled mixture, and the mixture is stirred for 20 min. to form the imino chloride. The reaction mixture is further cooled to −20°C. and 125 parts by volume of methanol is added thereto to prepare the imino ether. The thus obtained mixture is warmed up to room temperature, and 20 parts by volume of a 25% aqueous formic acid is added thereto. Triethylamine is further added thereto to adjust the pH at about 3.5. The resulting precipitates are collected to obtain 7-amino-3-exomethylenecepham-4-carboxylic acid, which is found to be identical with the product obtained in Example 10.

EXAMPLE 12

7-(5-carboxy-5-isobornyloxycarbonylaminovalerylamido)-3-exomethylenecepham-4-carboxylic acid is treated in the similar manner as Example 11 to give 7-amino-3-exomethylenecepham-4-carboxylic acid.

EXAMPLE 13

To 14000 parts by volume of dimethylsulfoxide in 7000 parts by volume of water are added 400 parts of sodium 7-[D-2-amino-2-(1-cyclohexenyl)-acetoamido]cephalosporanate and 400 parts of chromous acetate.

The mixture is stirred in a nitrogen atomosphere at room temperature for 24 hours. The reaction mixture is poured into a large amount of water, followed by adjusting to a pH of 4.5 with an aqueous solution of sodium hydrogen carbonate and cooled. The resulting precipitates are collected by filtration. The thus obtained compound, after drying, is added to 2000 parts by volume of pyridine, followed by the addition of 100 parts of trimethylchlorosilane. The mixture is allowed to stand at room temperature for 24 hours. The reaction mixture is concentrated under reduced pressure.

To the residue are added 300 parts by volume of water, followed by filtration. The filtrate is brought to a pH of 4.5. The precipitates formed thereupon are collected by filtration to obtain 35 parts of 7-[2-amino-2-(1-cyclohexenyl)-acetamido]-3-methyl-3-cepham-4-carboxylic acid.

In the ultraviolet spectrum (in an aqueous solution of sodium hydrogen carbonate), this compound shows an absorption maximum at 258 m$\mu$. In the infrared spectrum (KBr disc), this compound shows an absorption due to a $\beta$-lactam at 6.3 $\mu$.

EXAMPLE 14

Under ice-cooling, 200 parts of 7-amino-3-exomethylenecepham-4-carboxylic acid and 500 parts of sodium hydrogen carbonate are dissolved in 10,000 parts by volume of water. To this solution is added dropwise a solution of 164 parts of 2-thienylacetyl chloride in 1000 parts by volume of acetone. The mixture is stirred at 5°–10°C for 1 hour. The resulting reaction mixture is washed with 50,000 parts by volume of ether, brought to a pH of 2.0 with dilute hydrochloric acid and extracted with ethyl acetate. The ethyl acetate layer is dried and, then, a solution of sodium 2-ethylhexanoate in isopropanol is added. The precipitates formed thereupon are dissolved in water and lyophilized to give 270 parts of sodium 7-(2-thienylacetamido)-3-exomethylenecepham-4-carboxylate.

In the infrared spectrum (KBr disc), this product shows an absorption of the $\beta$-lactam at 5.75 $\mu$ and that of the exomethylene group at 11 $\mu$. In the ultraviolet spectrum (water), this product does not show any absorption characteristic of a $\Delta^3$-cephem ring in the neighborhood of 260 m$\mu$. The nuclear magnetic resonance spectrum (heavy water, 100 Mc) of this product shows an overlapping doublet due to the 2-methylene protons at 3.50–3.79 ppm (J=12 cps), a singlet due to the thiophene ring 2-methylene protons at 4.07 ppm, a doublet due to the 3-exomethylene protons at 5.42 ppm (J=3 cps), two doublets ($J_{6-7}$=4 cps) due to the hydrogens in 6 and 7 positions at 5.54 and 5.60 ppm, respectively and a multiplet assignable to the thiophene ring protons at 7.15–7.60 ppm.

EXAMPLE 15

Phenylacetylchloride is used in the similar manner as Example 14 to give 370 parts of sodium 7-phenylacetamido-3-exomethylenecepham-4-carboxylate.

This product melts at 220°–222°C (decomp.) and, in the infrared spectrum (KBr disc), shows an absorption of the β-lactam at 1740 cm$^{-1}$ and that of the exomethylene group at 920 cm$^{-1}$. The nuclear magnetic resonance spectrum (heavy water, 100 Mc) of this compound shows an AB quartet due to the 2-methylene protons at 3.64 ppm, a singlet due to the hydrogen in the 4 position at 5.12 ppm, two singlets due to the 3-exomethylene protons at 5.39 and 5.41 ppm, and an AB quartet due to the hydrogens in the 6 and 7 position at 5.46 ppm.

EXAMPLE 16

Phenoxyacetyl chloride is used in a similar manner as Example 14 to give 320 parts of sodium 7-phenoxyacetamido-3-exomethylenecepham-4-carboxylate.

This product melts at 208°–212°C (decomp.) and, in the infrared spectrum (KBr disc), shows an absorption of the β-lactam at 1750 cm$^{-1}$ and that of the exomethylene group at 920 cm$^{-1}$. The nuclear magnetic resonance spectrum (heavy water, 100 Mc) of this compound shows a quartet due to the 2-methylene protons at 3.62 ppm, a singlet due to the hydrogen in 4 position at 5.23 ppm, a doublet due to the 3-exomethylene group at 5.80–5.82 ppm, and an AB quartet due to the hydrogens in the 6 and 7 position at 5.60 ppm.

EXAMPLE 17

In 20,000 parts by volume of dichloromethane are dissolved 228 parts of methyl 7-amino-3-exomethylenecepham-4-carboxylate and 121 parts by volume of N,N-dimethylaniline, followed by the addition of 176 parts of 2-thienylacetyl chloride.

The mixture is stirred at room temperature for 5 hours and the resulting reaction product is worked up to obtain 200 parts of methyl 7-(2-thienylacetamido)-3-exomethylenecepham-4-carboxylate.

This product melts at 77.5°–78.5°C and, in the infrared spectrum (in chloroform), shows an absorption of the β-lactam at 5.67 μ and that of the exomethylene group at 11 μ. The nuclear magnetic resonance spectrum (deuteriochloroform, 100 Mc) of this compound shows an AB quartet due to the 2-methylene protons at 3.37 ppm, a singlet due to the ester methyl protons at 3.72 ppm, a singlet assignable to the thiopene ring 2-methylene protons at 3.78 ppm, a singlet due to the hydrogen in the 4 position at 5.01 ppm, a broad singlet due to the 3-exomethylene protons at 5.17 ppm, a doublet and a doublet of doublet due to the hydrogens in the 6 and 7 position at 5.32 and 5.60 ppm, respectively and a doublet due to the 7-NH group at 6.45 ppm.

EXAMPLE 18

185 parts of tributylamine and 214 parts of 7-amino-3-exomethylenecepham-4-carboxylic acid are dissolved in 30,000 parts by volume of chloroform.

To this solution is added 121 parts by volume of N,N-dimethylaniline, and the mixture is cooled to 5°–10°C.

Then, 207 parts of D-phenylglycyl chloride hydrochloride is added over 10 minutes. The mixture is stirred at 5°–10°C for 1 hour and, then, at 10°–15°C for 2 hours. The resulting reaction product is extracted with a 5% aqueous solution of sodium hydrogen carbonate and the extract is passed through the column packed with polystyrene resin (Amberlite XAD-II; manufactured by Rohm & Haas Co. U.S.A.) to yield 56 parts of purified sodium 7-(D-2-amino-2-phenylacetamido)-3-exomethylenecepham-4-carboxylate.

This product melts at 178°C (sintered) and, in the infrared spectrum (KBr disc), shows an absorption of the β-lactam at 1750 cm$^{-1}$ and that of the exomethylene group at 917 cm$^{-1}$. The nuclear magnetic resonance spectrum (heavy water, 100 Mc) of this compound shows a quartet due to the 2-methylene protons at 3.50 ppm, a singlet due to the hydrogen in the 4 position at 5.07 ppm, a singlet due to the 3-exomethylene protons at 5.33 ppm, a doublet due to the hydrogen in 6 position at 5.49 ppm ($J_{6-7}$=4 cps), and a doublet due to the hydrogen in the 7-position at 5.65 ppm ($J_{7-6}$=4 cps).

To 400 parts by volume of pyridine is added 16.5 parts of the above-prepared sodium 7-(D-2-amino-2-phenylacetamido)-3-exomethylenecepham-4-carboxylate, followed by the addition of 80 parts by volume of trimethylchlorosilane. The mixture is allowed to stand at 25°C for 24 hours and the reaction mixture is concentrated under reduced pressure at room temperature. To the concentrate is added 100 parts by volume of water, followed by filtration. The filtrate is brought to a pH of 4.0 and cooled. The precipitates formed thereupon are recovered by filtration to obtain 15 parts of 7-(D-2-amino-2-phenylacetamido)-3-methyl-3-cephem-4-carboxylic acid. This product shows in the ultraviolet spectrum, an absorption of the Δ$^3$-cephem ring at 260 mμ ($\epsilon$=7700). The nuclear magnetic resonance spectrum (trifluoroacetic acid, 100 Mc) of this compound shows a singlet due to the 3-methyl protons at 2.30 ppm and a quartet due to the 2-methylene protons at 3.35 ppm.

EXAMPLE 19

At 5°C, a solution of 128 parts of 1H-tetrazol-1-yl-acetic acid and 206 parts N,N'-dicyclohexyldiimide in 10,000 parts by volume of tetrahydrofuran is added dropwise to a solution of 101 parts by volume of triethylamine and 214 parts of 7-amino-3-exomethylenecepham-4-carboxylic acid in 30,000 parts by volume of dichloromethane. The mixture is stirred at the same temperature for 2 hours, and then at a temperature of 10°–15°C for 3 hours. The insoluble matters are removed by filtration and the filtrate is concentrated under reduced pressure. The concentrate is extracted with a 5% aqueous solution of sodium hydrogen carbonate and, then, purified with a polystyrene resin column (XAD-II) to give sodium 7-[2-(1H-tetrazol-1-yl) acetamido]-3-exomethylenecepham-4-carboxylic acid. In the infrared spectrum (KBr disc), this compound shows an absorption of the β-lactam at 1750 cm$^{-1}$ and that of the exomethylene group at 922 cm$^{-1}$ (KBr disc.) The nuclear magnetic resonance spectrum (heavy water 100 Mc) of this product shows a quartet due to the 2-methylene protons at 3.68 ppm, a singlet due to the hydrogen in the 4 position at 5.16 ppm, a doublet due to the 3-exomethylene protons at 5.42–5.46 ppm, doublets due to the hydrogens in the 6 and 7 position at 5.59 and 5.66 ppm, respectively ($J_{6-7}$=4 cps), a singlet due to the tetrazole ring proton at 5.70 ppm and a singlet due to the tetrazole hydrogen in the 5 position at 9.44 ppm.

EXAMPLE 20

In 10,000 parts by volume of tetrahydrofuran are dissolved 251 parts of N-(t)-butoxycarbonylphenylglycine and 101 parts by volume of triethylamine and, at −10°-−7°C, 136.5 parts of isobutyl chloroformate is added dropwise to this solution. At the same temperature, the mixture is stirred for 30 minutes and the precipitated triethylamine hydrochloride is filtered off. The resulting solution is mixed acid anhydride is added dropwise to a solution of 214 parts 7-amino-3-exomethylenecepham-4-carboxylic acid and 101 parts triethylamine in 20,000 parts by volume of dichloromethane, followed by sitrring at 10°–15°C for 2 hours. The reaction mixture is concentrated under reduced pressure and the concentrate dissolved in ethyl acetate. The resulting solution is extracted with a 5% aqueous solution of sodium hydrogen carbonate. Ethyl acetate is added to the aqueous layer. The mixture is adjusted to a pH of 2.0 with dilute HCl. The ethyl acetate layer thus obtained is dried over magnesium sulfate and to the dried ethyl acetate layer is added diazomethane to give methyl 7-( 2-t-butoxycarbonylamino-2-phenylacetamido)-3-exomethylenecepham-4-carboxylate. The nuclear magnetic resonance spectrum (deuteriochloroform, 100 Mc) of this product shows a singlet due to the t-butyl protons at 1.40 ppm, a slightly broad singlet due to the 3-exomethylene protons at 5.18 ppm and a singlet due to the 7-phenyl ring protons at 7.32 ppm.

EXAMPLE 21

In 2000 parts by volume of dimethylacetamide is suspended 214 parts of 7-amino-3-exomethylenecepham-4-carboxylic acid, followed by the addition of 217 parts of β-methylsulfonylethyl chloroformate. The mixture is stirred for 2 hours, during which time the suspended material is dissolved. The dimethylacetamide is distilled off under reduced pressure and the residue is dissolved in anhydrous tetrahydrofuran, followed by extraction with a 5% aqueous solution of sodium hydrogen carbonate. The extract is treated with a column packed with polystyrene resin (XAD-II), whereupon sodium 7-(β-methylsulfonylethoxycarbonylamino)-3-exomethylenecepham-4-carboxylate is obtained. The nuclear magnetic resonance spectrum (heavy water, 100 Mc) of this product shows a singlet due to the methylsulfonyl protons at 3.34 ppm, a singlet due to the hydrogen in the 4 position at 5.14 ppm, a singlet due to the 3-exomethylene protons at 5.45 ppm and doublets due to the hydrogens in the 6 and 7 position at 5.47 and 5.57 ppm, respectively ($J_{6-7}$=4 cps).

EXAMPLE 22

Isobornyloxy chloroformate is used in a similar manner as in Example 21 to give sodium 7-isobornyloxycarbonylamino-3-exomethylenecepham-4-carboxylate.

EXAMPLE 23

To 20,000 parts by volume of tetrahydrofuran are added 151 parts of α-aminoadipic acid and 185 parts of tributylamine. To the mixture is added at −10° - −5°C, 136.5 parts of isobutyl chloroformate and the mixture is stirred at −5° - 0°C for one hour and the precipitated tributylamine hydrochloride is filtered off. The resulting solution of mixed acid anhydride is added to a solution of 214 parts 7-amino-3-exomethylenecepham-4-carboxylic acid and 101 parts triethylamine in 30,000 parts by volume of dichloromethane, followed by stirring for 5 hours. The solvent is distilled off under reduced pressure and the residue is dissolved in a 5% aqueous solution of sodium hydrogen carbonate. The solution is passed through a column packed with polystyrene resin (XAD-II) to obtain sodium 7-(5'-carboxy-5'-aminovalerylamino)-3-exomethylenecepham-4-carboxylate. The nuclear magnetic resonance spectrum (heavy water, 100 Mc) of this product shows a triplet due to the valeryl 2-protons at 2.66 ppm, a quartet due to the 2-methylene protons at 3.74 ppm, a triplet due to the valeryl 5-hydrogen at 4.00 ppm, a singlet due to the hydrogen in the 4 position at 5.21 ppm, a doublet due to the hydrogen in the 7 position at 5.50 ppm and a singlet due to the 3-exomethylene protons at 5.63 ppm.

EXAMPLE 24

In 6000 parts by volume of dimethylacetamide is suspended 365 parts of sodium 7-amino-3-exomethylenecepham-4-carboxylate and, then, to this suspension is added dropwise a solution of 1000 parts D-2-(β-methylsulfonylethoxycarbonylamino)-2-phenylacetyl chloride in 2000 parts by volume of acetonitrile at 18°–20°C. The mixture is stirred for 1 hour. To the resulting reaction mixture is added 50000 parts by volume of water, followed by extraction with ethyl acetate. The ethyl acetate layer is concentrated and the concentrate dissolved in 4000 parts by volume of tetrahydrofuran. To the solution is added a solution of sodium 2-ethylhexanoate in isopropanol, and the precipitates formed thereupon are collected by filtration to obtain the 7-D-2-(β-methylsulfonylethoxycarbonylamino)-2-phenylacetamido-3-exomethylenecepham-4-carboxylic acid sodium salt.

In 10,000 parts by volume of water is dissolved 519 parts of the above product, followed by the addition of 1100 parts by volume of a 1N-aqueous solution of sodium hydroxide. The mixture is stirred at room temperature for 30 minutes. The resulting reaction mixture is adjusted to a pH of 1.5 with dilute hydrochloric acid and, then, to a pH of 8.00 with a 1N-aqueous solution of sodium hydroxide. The solution is treated with a column packed with polystyrene resin (XAD-II) to obtain the 7-(D-2-amino-2-phenylacetamido)-3-exomethylenecepham-4-carboxylic acid sodium salt. This product is in complete agreement with the compound obtained in Example 5.

EXAMPLE 25

In 400 parts by volume of pyridine is dissolved 30 parts of methyl 7-(2-thienylacetamido)-3-exomethylenecepham-4-carboxylate and the solution is allowed to stand at 22°C for 24 hours. The reaction product is poured into 10000 parts by volume of water, followed by extraction with chloroform.

The chloroform layer is washed with dilute hydrochloric acid and then with water and, after drying over magnesium sulfate, the chloroform is distilled off under reduced pressure to give 30 parts of methyl 7-(2-thienylacetamido)-3-methyl-3-cephem-4-carboxylate.

In the ultraviolet spectrum (ethanol), this compound shows an absorption characteristic of a $\Delta^3$-cephem ring at 260 mμ.

The nuclear magnetic resonance spectrum of this compound (deuteriochloroform, 100 Mc) shows a singlet due to the 3-methyl protons at 2.10 ppm, an AB quartet due to the 2-methylene protons at 3.28 ppm, a singlet due to the ester methyl protons at 3.69 ppm, a singlet due to the thiophene 2-methylene protons at 4.01 ppm, a doublet due to the C$_6$-hydrogen at 5.10 ppm (J$_{6-7}$=4 cps), a doublet of doublet due to the C$_7$-hydrogen at 5.70 ppm (J$_{6-7}$=4 cps, J$_{7-NH}$=10 cps), a doublet due to the 7-NH at 6.52 ppm (J$_{7-NH}$=10 cps) and a multiplet assignable to the thiophene ring protons at 6.90–7.30 ppm.

EXAMPLE 26

In 400 parts by volume of pyridine is dissolved 35 parts of 7-(2-thienylacetamido)-3-exomethylenecepham-4-carboxylic acid, followed by the addition of 20 parts of trimethylchlorosilane. The mixture is allowed to stand at 20°C for 20 hours. The reaction mixture is poured into water and treated in a similar manner as in Example 1. The resulting solid product is dissolved in a mixture of tetrahydrofuran and ether, and sodium 2-ethylhexanoate is added. The precipitates formed thereupon are recovered by filtration, whereupon 29 parts of sodium 7-(2-thienylacetamido)-3-methyl-3-cephem-4-carboxylate is obtained. This product melts at 231°C and shows in the infrared spectrum (KBr disc) an absorption characteristic of a β-lactam at 5.75 μ.

EXAMPLE 27

In a mixture of 300 parts by volume of chloroform and 300 parts by volume of triethylamine is dissolved 50 parts of methyl 7-(2-thienylacetamido)-3-exomethylenecepham-4-carboxylate. The solution is allowed to stand at 24°C for 20 minutes, whereupon some amount of methyl 7-(2-thienylacetamido)-3-methyl-3-cephem-4-carboxylate, which is the isomerization product, separates out from the reaction mixtures. The mixture is further allowed to stand for 24 hours and, then, worked up in the similar manner as Example 25 to give 49 parts of methyl 7-(2-thienylacetamido)-3-methyl-3-cephem-4-carboxylate.

EXAMPLE 28

In a small quantity of benzene is dissolved 100 parts of methyl 7-(2-thienylacetamido)-3-exomethylenecepham-4-carboxylate. The solution is charged on the column packed with 2000 parts of silica gel and the column is allowed to stand at 22°C for 48 hours. Then, chloroform is passed through the column, whereupon 42.3 parts of methyl 7-(2-thienylacetamido)-3-methyl-3-cephem-4-carboxylate elutes from the column. In addition, 50.7 parts of the starting material ester is recovered.

EXAMPLE 29

To 400 parts by volume of pyridine are added 16.5 parts of sodium 7-(D-2-amino-2-phenylacetamido)-3-exomethylenecepham-4-carboxylate and 80 parts of trimethylchlorosilane.

The mixture is allowed to stand at 25°C for 24 hours, and the reaction mixture is concentrated under reduced pressure at room temperature. The concentrate is diluted with 100 parts of water and filtrated. The filtrate is adjusted to pH 4.0 and cooled. The resulting precipitates are collected by filtration, whereupon 15 parts of 7-(D-2-amino-2-phenylacetamido)-3-methyl-3-cephem-4-carboxylic acid is obtained. In the ultraviolet spectrum, this compound shows an absorption characteristic of a Δ$^3$-cephem ring at 260 mμ (ε=7700). The nuclear magnetic resonance spectrum of this compound (trifluoroacetic acid, 100 Mc) shows a singlet due to the 3-methyl protons at 2.30 ppm and a quartet due to the 2-methylene protons at 3.35 ppm.

EXAMPLE 31

In 10,000 parts by volume of water is dissolved 10 parts of sodium 7-[1-(1H)-tetrazolylacetamido]-3-exomethylenecepham-4-carboxylate.

The solution is passed through a column packed with polystyrene resin (Amberlite XAD-II; manufactured by Rohm & Haas Co. U.S.A., 100–200 mesh; 45 cm long × 2 cm diameter; solvent:1% aqueous alcohol), whereupon 3 parts of sodium 7-[1-(1H)-tetrazolylacetamido]-3-methyl-3-cephem-4-carboxylate is obtained. In this procedure, 5 parts of the starting material is recovered.

In the ultraviolet spectrum (in water), the former compound shows an absorption characteristic of a Δ$^3$-cephem ring at 264 mμ. The nuclear magnetic resonance spectrum (heavy water 100 Mc) of this compound shows a singlet due to the 3-methyl protons at 2.07 ppm, an AB quartet due to the 2-methylene protons at 3.60 ppm, a doublet due to the hydrogen in 6-position at 5.29 ppm (J$_{6-7}$=5 cps), a doublet due to the hydrogen in the 7-position at 5.82 ppm (J$_{7-6}$=5 cps), a singlet due to the tetrazolylacetyl protons at 5.72 ppm and a singlet assignable to the tetrazole ring proton at 9.47 ppm.

What we claim is:

1. A process for producing a compound of the formula:

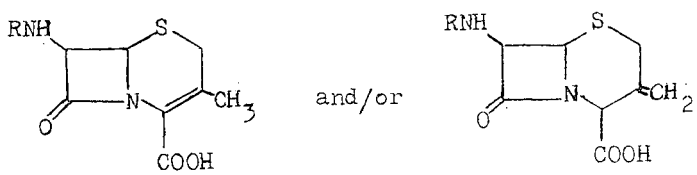

wherein R is hydrogen or an acyl group selected from the group consisting of 5-amino-5-carboxyvaleryl, thienylacetyl, phenylglycyl, α-sulfophenylacetyl, pyridylthioacetyl, phenoxyacetyl, 5-methyl-3-phenyl-4-isoxazolylcarbonyl, 1-cyclohexenylglycyl, cyanoacetyl, tetrazolylacetyl, β-ethylsulfonylethoxycarbonyl and β-phenylsulfonylethoxycarbonyl, which comprises reacting a compound of the formula:

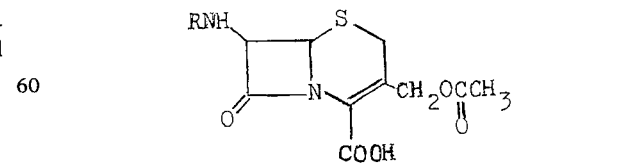

wherein R is as defined above, with a compound selected from the group consisting of chromous acetate, chromous sulfate, chromous chloride and chromous ethylenediamine at a temperature of from 0°C to 100°C and at a pH of from 2 to 8.

2. A process for producing a compound of the formula:

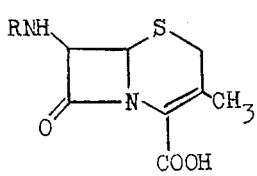

wherein R is hydrogen or an acyl group selected from the group consisting of 5-amino-5-carboxyvaleryl, thienylacetyl, phenylglycyl, α-sulfophenylacetyl, pyridylthioacetyl, phenoxyacetyl, 5-methyl-3-phenyl-4-isoxazolylcarbonyl, 1-cyclohexenylglycyl, cyanoacetyl, tetrazolylacetyl, β-ethylsulfonylethoxycarbonyl and β-phenylsulfonylethoxycarbonyl, which comprises reacting a compound of the formula:

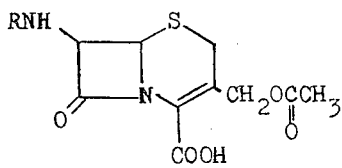

wherein R is as defined above, with a compound selected from the group consisting of chromous acetate, chromous sulfate, chromous chloride and chromous ethylenediamine at a temperature of from 0°C to 100°C and at a pH of from 2 to 8 and, when a compound of the formula:

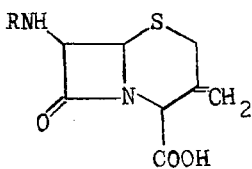

wherein R is as defined above, is obtained, contacting it with a catalyst selected from the group consisting of pyridine, picoline, lutidine, quinoline, isoquinoline, dimethlaniline, triethylamine, N-methylpiperidine, silica gel and alumina at a temperature of from 0°C to 100°C.

3. A process for producing a compound of the formula:

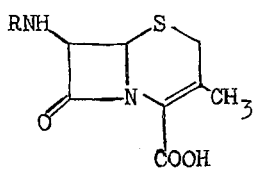

wherein R is hydrogen or an acyl group selected from the group consisting of 5-amino-5-carboxyvaleryl, thienylacetyl, phenylglycyl, α-sulfophenylacetyl, pyridylthioacetyl, phenoxyacetyl, 5-methyl-3-phenyl-4-isoxazolylcarbonyl, 1-cyclohexenylglycyl, cyanoacetyl, tetrazolylacetyl, β-ethylsulfonylethoxycarbonyl and β-phenylsulfonylethoxycarbonyl, which comprises contacting a compound of the formula:

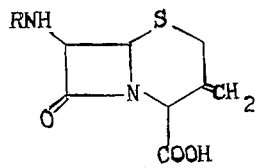

wherein R is as defined above, with a catalyst selected from the group consisting of pyridine, picoline, lutidine, quinoline, isoquinoline, dimethlaniline, triethylamine, N-methylpiperidine, silica gel and alumina at a temperature of from 0°C to 100°C.

4. A process as claimed in claim 3, wherein R is an acyl group as defined.

5. A process as claimed in claim 1, wherein R is hydrogen, 5-amino-5-carboxyvaleryl, phenylglycyl or 1-cyclohexenglycyl.

6. A process as claimed in claim 4, wherein the acyl group is 5-amino-5-carboxyvaleryl, phenylglycyl or 1-cyclohexenylglycyl.

7. A process as claimed in claim 4, wherein the starting compound is prepared by acylating 7-amino-3-exomethylenecepham-4-carboxylic acid.

8. A process as claimed in claim 4, wherein the starting compound is prepared by deacylating 7-(5-amino-5-carboxyvalerylamido)-3-exomethylenecepham-4-carboxylic acid and by acylating the thus obtained 7-amino-3-exomethylene-cepham-4-carboxylic acid.

9. A process according to claim 1, wherein the amino substituted acyl groups are protected in the conventional manner.

10. A process according to claim 2, wherein the amino substituted acyl groups are protected in the conventional manner.

11. A process according to claim 3, wherein the amino substituted acyl groups are protected in the conventional manner.

12. A process as claimed in claim 2, wherein R is hydrogen, 5-amino-5-carboxyvaleryl, phenylglycyl or 1-cyclohexenglycyl, 13. A process as claimed in claim 3, wherein R is hydrogen, 5-amino-5-carboxyvaleryl, phenylglycyl or 1-cyclohexenylglycyl.

* * * * *